3,539,546
CATALYTIC SYSTEM FOR THE POLYMERIZATION OF VINYL CHLORIDE AND OTHER ETHYLENIC MONOMERS
Georgette Steinbach van Gaver, Paris, France, assignor to Produits Chimiques Pechiney-Saint-Gobain, Paris, France
No Drawing. Filed Jan. 12, 1967, Ser. No. 608,723
Claims priority, application France, Feb. 9, 1966, 48,946
Int. Cl. C08f 3/30, 15/08
U.S. Cl. 260—92.8
6 Claims

ABSTRACT OF THE DISCLOSURE

In a process for the polymerization of homopolymers and copolymers of vinyl chloride in an inert atmosphere at temperatures from −35° C. to +10° C. with a catalytic system consisting of a trialkylboron hydrazine complex, active oxygen supplied by a peroxide, the improvement in the rate of polymerization by including from 0.0046 to 0.0279 gram of molecular oxygen per 100 grams of monomer.

---

This invention relates to catalyst systems for the polymerization of ethylenic monomers, especially those containing vinyl chloride. As vinyl chloride is probably the most important of these monomers the invention will be described in relation to its polymerization alone or with compatible comonomers.

There is a catalytic system called Redox, which refers to the association of a peroxide catalyst and a reducing compound, which has been used in the polymerization of monomeric compositions having one or more double bonds called ethylene linkages. The peroxide catalysts and the reducing compounds have been described in the patent literature and professional publications so that their natures are well known and need no delineation. In accordance with that system it has been proposed to polymerize vinyl chloride, with or without other monomers, below 0° C. with mixtures, in catalytic quantity, of a peroxide with a complex of trialkylboron and hydrazine of the general formula $R_3B:NH_2—NH_2$ in which R is an alkyl radical of 1 to 4 carbon atoms. Such catalytic mixtures produced limited polymerization at such low temperature while their components taken separately are inactive at those temperatures. The hourly and total yields produced by such mixtures are industrially unsatisfactory.

It is an object of this invention to make new catalyst systems capable of operating successfully on a commercial scale and especially to improve the action of the Redox system.

The objects of the invention have been accomplished generally speaking by a catalytic system for the polymerization of monomers containing ethylenic double bonds having as essential constituents a peroxide, a trialkylboron hydrazine complex, and oxygen; the method of polymerizing monomers comprising vinyl chloride comprises mixing such monomers with a catalyst system as aforesaid and agitating at a temperature in the range from about −35° C. to +10° C. It is astonishing that by the addition of oxygen as such to a mixture already containing oxygen as peroxide a vast increase in activity at temperatures below 0° C. and a large increase in hourly and total production should occur.

The examples which follow are directed to monomers having a vinyl chloride base, which means vinyl chloride alone or mixed with compatible, copolymerizable monomers. Illustrative of the wide scope of the invention in this aspect are successful copolymerizations with vinyl acetate, vinyl laurate, vinyl stearate, the methyl to lauryl acrylate and methyl acrylate, monochlorotrifluoroethylene acrylonitrile, dichlorethylene 1-1, dichloroethylene 1-2, and trichlorethylene. On the basis of these tests it is reasonable to assert that the invention is applicable to polymerize ethylenic monomers in general.

The new products which are produced by this process have properties which are the equal of those produced by any process at low temperature both as to molecular weight and mechanical and chemical qualities.

In utilizing the new system it is to be noted that the peroxide catalysts have a subclass which contains polar groups and that these are preferred in the present invention. For example, monochloracetyl peroxide is convenient to use and produces excellent results. When dissolved in dimethyl phthalate the input of active oxygen derived from the peroxide can be exactly controlled and it leaves no solid residues in the resins.

The trialkylboron hydrazines are prepared by known methods, for instance by the reaction under inert atmosphere of hydrazine with a selected trialkylboron containing from 1 to 4 C., the temperature being kept at 55 to 60° C. and the complex being distilled. Triethylboron hydrazine performs exceptionally well in the new system. The quantities of the ingredients of the catalyst system which are to be used will depend upon the monomers which are being polymerized and to a minor degree on the temperature of polymerization. It is somewhat surprising that the proportions of the ingredients in the system are important. The preferred ratio for the hydrazine complex, for the active oxygen derived from peroxide, and for molecular oxygen are respectively about 1–0.16 and 0.3 millimoles per hundred grams of monomer but the total may vary within the following boundaries depending upon the comonomers being polymerized: from .065 to .390 g. of triethylboron hydrazine with a preference at about 0.130 g.; from .0026 to .0156 g. of active oxygen from the peroxide and preferably about .0053 g.; from .0046 to .0279 g. of molecular oxygen and preferably about .0096 g.

For example, to polymerize vinyl chloride at −1° C. the minimal quantities indicated above are satisfactory but for polymerization at −12° C. one would use the preferred amounts. In order to polymerize a mixture of 85% vinyl chloride and 15% vinyl acetate at −12° C. one would use one and one-half times the preferred amounts.

I have also discovered that an excess or a shortage of molecular oxygen in the catalyst system, measured by the range given above, reduces the hourly and total yield from the polymerization.

These polymerizations may be carried out at a temperature range between about −35° C. and about +10° C. but they are more generally accomplished at a temperature between −20 and 0° C.

A solvent such as methanol or acetone can be used with advantage during the polymerization to solubilize the active species better, accelerating the polymerization and improving the mean hourly yield. The following examples include some which are for comparative purposes and some which demonstrate the merit of the invention.

EXAMPLE 1.—COMPARATIVE

In this example polymerization is carried out in contact with air but in quantities which are not well controlled and which do not respond to the preferential quantitative figures given hereinabove. The speeds of polymerization are inferior and the operations are not satisfactorily reproducible.

(1a) A 10 liter stainless steel autoclave provided with an anchor-type agitator, with a liquid jacket for temperature control, and with a lid carrying a thermometer, two valves for charging and releasing gases, a manometer and an orifice closed by a screw lid, was purged with nitrogen at room temperature and received 3000 g. of vinyl chloride to be polymerized and 450 g. for ejection of gases. During the charge 150 g. of monomer were discharged. The autoclave was cooled to −20° C. with agitation evacuating the autoclave to about 16.8 cm. of mercury, which was annulled by introducing air through one of the valves in the amount of 1,150 cc., which provided 243.6 cc. of oxygen or .0116 g. of oxygen for each 100 g. vinyl chloride. The agitation was stopped and the screw covered orifice was opened and received 5.3 g. of monochloroacetyl peroxide in methyl phthalate which provided 3% or .159 g. of active oxygen. Then 150 g. of methanol were admitted of which a part was used to rinse the receptacle which had contained the peroxide. The orifice was closed and the agitator was run for 30 seconds then the orifice was opened and 3.9 g. of triethylboron hydrazine and 150 g. of methanol were introduced, some of the methanol having been used to rinse the vessel which had contained the complex. The orifice was closed again and the agitation begun while keeping the temperature between −20 and −12° C. 300 g. of the reaction medium (10%) were vented in a few minutes. Analysis of the discharged gas indicated the presence of .168 g. of molecular oxygen so that the amount entering into the reaction was .18 g. or .006% of the vinyl chloride. Polymerization continued for 6 hours at −12° C., the pressure being approximately 75 g. on the manometer. The gases were released from the autoclave and the polymer discharged and dried in a ventilated oven. The overall yield was 24% and the mean hourly yield was 4%.

autoclave carried the instruments and equipment described in Example 1 with the addition of a butyl rubber membrane 3 mm. thick in an orifice. Seven tests were carried out in this autoclave in order to demonstrate the superiority of the system and to determine the limits of satisfactory operation. These tests were carried out in sequence and are labeled A, B, C, D, E, F and G. The first test, A, was for comparative purposes. In carrying it out the autoclave was charged with 40 g. of methanol, cooled to −15° C., purged by a rapid succession of four exacuations at a vacuum of 30 mm. of mercury, followed by admissions of nitrogen. 440 g. of vinyl chloride were put into the autoclave and the temperature was raised to −12° C. while vaporizing 40 g. of monomer with agitation, the autoclave being vented. By means of hypodermic syringes there was introduced through the membrane .7 cc. of a solution of monochloracetyl peroxide in methyl phthalate, yielding 3.03 g. of active oxygen in 100 cc., or .0053 g. of active oxygen per 100 g. of vinyl chloride; and .6 cc. of triethylboron hydrazine, density, .8666, or .13 g. per 100 g. of monomer. No further expulsion of gas occurred. For 3 hours 10 minutes the mass was agitated at −12° C., forming only a trivial product. The unreacted monomer was vented. The yield of polymer was dried and weighed and was .43%, representing a mean hourly yield of .14%.

In tests B, C, D, E, F, G, the tests were carried out as above except that immediately after the addition of the two catalysts molecular oxygen was introduced through the rubber membrane by a hypodermic syringe. The comparative results, as well as the conditions of the tests have been set forth in the following table:

TABLE I

| Test | A | B | C | D | E | F | G |
|---|---|---|---|---|---|---|---|
| Cc. of oxygen introduced | 0 | 10 | 20 | 30 | 40 | 60 | 80 |
| Mg. of molecular oxygen per 100 g. vinyl chloride | 0 | 3.5 | 7.2 | 10.8 | 14.4 | 22.6 | 29 |
| Duration of polymerization in hours | 3h10 | 2h40 | 2h | 2h | 2h | 2h | 2h |
| Total yield in percent by weight | 0.43 | 8 | 9.5 | 12.8 | 12.6 | 10.75 | 7.75 |
| Yield per hour, percent | 0.14 | 2.18 | 4.75 | 6.40 | 6.30 | 5.38 | 3.38 |

(1b) The same operation was carried out but only 800 cc. of air (.242 g. of oxygen) were admitted. The final degassing eliminated .127 g.; the polymerization was therefore carried out in the presence of .115 g. of oxygen or .0038% of the weight of the monomer. After 6 hours the yield was only 15.6% for a mean hourly rate of 2.6%.

EXAMPLE 2.—COMPARATIVE

In this example the reaction medium contained no molecular oxygen. The operation was carried out as in Example 1 but preventing any preliminary contact with air and all reentry of air was prevented by injection of an atmosphere of nitrogen into the autoclave. The vacuum produced by cooling to −20° C. was brought to normal pressure by adding nitrogen and the addition of catalysts and methanol was made in a nitrogen atmosphere. The discharge of 5% gas during charging and 10% after addition of the catalysts was done as described above. After 6 hours of polymerization at −12° C. the yield was 2.8% which represented a mean hourly polymerization of slightly less than 0.5%.

EXAMPLE 3.—COMPARATIVE

This example shows that the use of trialkylboron hydrazine and molecular oxygen does not initiate the polymerization and that the action of the active oxygen of the peroxide is indispensable. The operation was carried out as in Example 1 but no peroxide was used. No polymerization occurred between −20° and 0° C. Changing the proportion of air does not change the result.

EXAMPLE 4.—THIS INVENTION

An autoclave of glass of 1 liter capacity provided with a magnetic anchor agitator was used. The cover of the This series of tests shows that the optimum operating condition, measured on the mean hourly transformation, is produced when the molecular oxygen is present in the reaction medium between .01 and .02 g. per 100 g. of vinyl chloride.

EXAMPLE 5

A 10 liter stainless steel autoclave equipped with the apparatus described in Example 1, and in addition having an eye bolt the aperture of which was closed by a membrane of rubber which could be perforated by a syringe for the introduction of catalyst. The autoclave was purged several times at −15° C. by injections of nitrogen under pressure followed by slow venting. The internal pressure was somewhat reduced and 300 g. methanol at −20° C. and 3300 g. vinyl chloride were introduced, of which 300 were used to expel the atmosphere of the autoclave. 195 cc. oxygen (.279 g. or .0093% of the vinyl chloride by weight) were injected and agitation proceeded for 5 minutes at 50 r.p.m. A syringe penetrated the membrane and delivered 5.6 cc. of a solution of monochloracetyl peroxide in dimethyl phthalate to provide 2.84 g. of active oxygen (.0053% by weight of the vinyl chloride). After 1 minute of agitation 4.6 cc. of triethylboron hydrazine (3.9 g. or .13% by weight of the vinyl chloride) were injected. The agitator was speeded up to 160 r.p.m. for 1 hour, the temperature at −12° C., then reduced to 50 r.p.m. for 5 hours. The residual monomer was vented, the charge dried, and weighed, a total production of 1,280 g. being obtained. The yield was 42% for a mean average of 7% per hour.

EXAMPLE 6

Proceeding otherwise as in Example 5, the autoclave received 2,550 g. vinyl chloride and 450 g. vinyl acetate.

The catalytic quantities introduced were 292 cc. of molecular oxygen (.0139%), 8.4 cc. of peroxide solution providing .008% of active oxygen, and 6.9 cc. of triethylboron hydrazine (.195%).

After 6 hours of copolymerization the yield was 34.8%, for a mean average of 5.8%.

The process proceeds well and even preferably at temperatures below 0° C. and thus constitutes a satisfactory low temperature process for the polymerization of vinyl chloride, the yield of which is commercially satisfactory. An outstanding accomplishment of the invention is the association of active oxygen provided by a peroxide catalyst with oxygen in its molecular state.

As many apparently widely different embodiments of the present invention may be made without departing from the spirit and scope thereof, it is to be understood that the invention is not limited to the specific embodiments.

What is claimed is:

1. A method of polymerizing vinyl chloride to prepare polymers having a base of vinyl chloride which comprises mixing a monomeric composition having a preponderant proportion of vinyl chloride with a catalytic system in an enclosed zone agitating the mixture at a temperature in the range from about −35° C. to +10° C., in an inert atmosphere, said catalytic system consisting of a trialkylboron hydrazine complex having the formula $R_3$—B: $NH_2$—$NH_2$ in which R is an alkyl group of from 1 to 4 C atoms, a peroxide for supplying active oxygen, and molecular oxygen, in molar ratio of trialkylboron hydrazine to the active oxygen from the peroxide to the molecular oxygen of about 1.0 to 0.16 to 0.3, the content of molecular oxygen in the zone being 0.0046% to 0.0279% by weight based on the weight of the monomeric composition.

2. A method according to claim 1 in which the mixture is agitated at a temperature from about −20° C. to 0° C.

3. A method according to claim 1 accompanied by agitation at different speeds.

4. A process according to claim 1 in which the monomeric composition contains only vinyl chloride.

5. The process according to claim 1 in which the monomeric composition additionally contains a comonomer selected from the group consisting of vinyl acetate, vinyl laurate, vinyl stearate, acrylic esters, methacrylic esters, dichloroethylene, trichloroethylene, and acrylonitrile.

6. A process for preparing polymers having a base of vinyl chloride which comprises polymerizing a monomeric composition having a preponderant proportion of vinyl chloride agitating in an enclosed zone, at a temperature of about −35° C. to about +10° C. under an inert atmosphere in the presence of a catalytic system consisting of triethylboron hydrazine complex, monochloroacetyl peroxide supplying active oxygen and molecular oxygen, the molar ratio of triethylboron hydrazine complex to active oxygen from the monochloroacetyl peroxide to molecular oxygen being about 1.0 to 0.16 to 0.3, the content of molecular oxygen in the zone being about 0.0096% by weight based on the weight of the monomeric composition.

References Cited

UNITED STATES PATENTS 3,169,947  2/1965  Stroh et al. _____ 260—85.5

OTHER REFERENCES

Steinbach et al.: Chem. ABS., 60, (1964), p. 13341d.
Sianesi et al.: Chem. ABS., (1965), p. 663d.

HARRY WONG, JR., Primary Examiner

U.S. Cl. X.R.

252—426; 260—85.5, 86.3, 87.1, 87.5